United States Patent [19]

Matsumoto

[11] Patent Number: 4,699,237

[45] Date of Patent: Oct. 13, 1987

[54] FOUR-WHEEL DRIVE SYSTEM FOR MOTOR VEHICLES

[75] Inventor: Rempei Matsumoto, Ohta, Japan

[73] Assignee: Fuji Jukogyo Kabushiki Kaisha, Tokyo, Japan

[21] Appl. No.: 933,736

[22] Filed: Nov. 21, 1986

[30] Foreign Application Priority Data

Dec. 5, 1985 [JP] Japan .................................. 60-273660
Dec. 19, 1985 [JP] Japan .................................. 60-286622

[51] Int. Cl.⁴ ............................................ B60K 17/34
[52] U.S. Cl. .................................................. 180/250
[58] Field of Search ............... 180/248, 249, 250, 247, 180/233

[56] References Cited

FOREIGN PATENT DOCUMENTS 59-179425 10/1984 Japan ..................................... 180/248
177724 12/1961 Sweden ................................ 180/249

Primary Examiner—John A. Pekar
Attorney, Agent, or Firm—Martin A. Farber

[57] ABSTRACT

A system is provided with a viscous coupling which is filled with a viscous material and adapted to transmit the output of a transmission through the viscous material. A first clutch and a second clutch are provided for selectively transmitting the output of the transmission to front and rear wheels. Each clutch is arranged to selectively transmit the output without interposing the viscous coupling and to selectively transmit the output through the viscous coupling.

4 Claims, 5 Drawing Figures

FOUR-WHEEL DRIVE SYSTEM FOR MOTOR VEHICLES

BACKGROUND OF THE INVENTION

The present invention relates to a four-wheel drive vehicle which is selectively driven in two-wheel drive mode or four-wheel drive mode.

A four-wheel drive vehicle of the type in which a transfer clutch is provided for transmitting the output torque of a transmission to auxiliary drive wheels is known. In such a vehicle, a power transmission system can be converted from a two-wheel drive system to a four-wheel drive system by engaging the transfer clutch. However, when the vehicle negotiates corners by the four-wheel drive system, braking phenomenon called "tight corner braking" will occur at a sharp corner. This is caused by greater radius of front wheels than that of rear wheels and therefore tendency to rotate faster than the rear wheels.

Recently, it is proposed to use a multiple-disk type hydraulic coupling filled with a viscous material (hereinafter called viscous coupling) as a transfer clutch. The viscous coupling has a characteristic that transmitting torque increases with increase of the difference between input speed and output speed. Accordingly, the viscous coupling acts to prevent the tight corner braking because of small difference between input and output speeds and to prevent slipping of wheels on slipperly roads because of large difference between input and output speeds.

Japanese Utility Model Application Laid Open No. 59-188731 discloses a four-wheel drive vehicle in which the output of a front-mounted engine is transmitted to rear wheels through a viscous coupling. Accordingly, the rear wheels are driven only when the speed of front wheels ($V_F$) is larger than the speed of rear wheels ($V_R$). In other words, in ordinary driven conditions, the vehicle is driven by front wheels only. Although the front-wheel driving is superior in steerability, driveability of the vehicle, particularly at starting of the vehicle at heavy load, is inferior compared with the rear-wheel driving.

SUMMARY OF THE INVENTION

The object of the present invention is to provide a four-wheel drive system which can be selectively changed into various drive modes whereby a motor vehicle can be driven in a desired drive mode.

In accordance with the present invention, the system has a viscous coupling having an input member operatively connected to an output shaft of the transmission and transmitting output of the transmission to an output member through viscous material interposed between the input member and the output member, a first clutch output for transmitting of the coupling to front wheels of the vehicle, a second clutch for transmitting the output of the coupling to rear wheels of the vehicle.

Each of the clutches has first clutch means and second clutch means, each clutch means including a shiftable engaging member. The first clutch means is operatively connected to the output shaft of the transmission and provided for transmitting the output of the transmission to wheels without interposing the coupling, and the second clutch means is operatively connected to the output member of the coupling and provided for transmitting the output of the transmission to wheels through the coupling. Each of the shiftable engaging members is shifted by a selector lever for selectively engaging each of the first and second clutch means.

In an aspect of the present invention, each clutch means comprises shiftable internal splines and external splines.

The other objects and features of this invention will be apparently understood from the following description with reference to the accompanying drawings.

DETAILED DESCRIPTION OF THE PREFERRED EMBODIMENTS

Figure 1A:
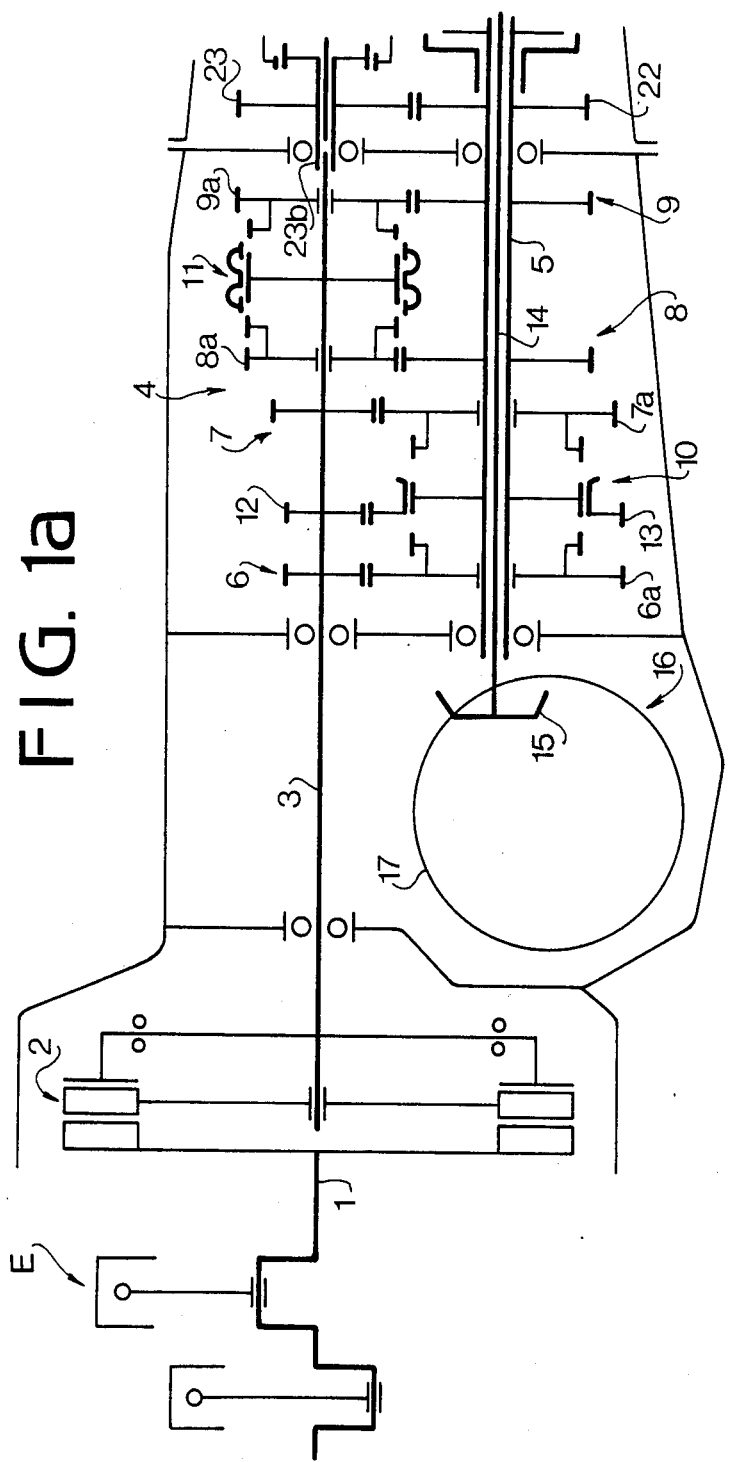
FIGS. 1a and 1b show a four-wheel drive system according to the present invention.
Figure 1B:
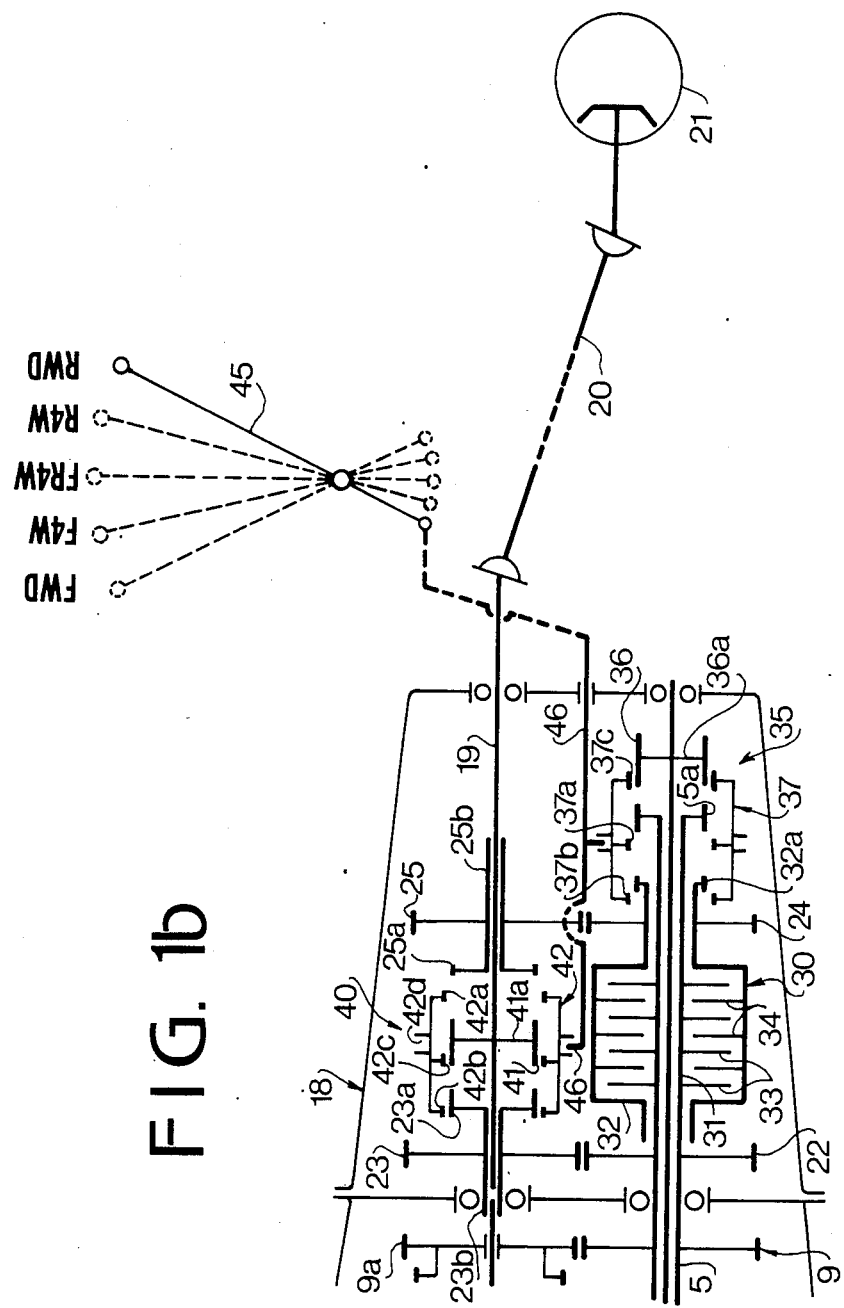

Referring to FIGS. 1a and 1b, a crankshaft 1 of an internal combustion engine E longitudinally mounted on a front portion of a vehicle is operatively connected with an input shaft 3 of a transmission 4 through a clutch 2.

The transmission 4 has a tubular output shaft 5 parallel with the input shaft 3. A first speed gear to a fourth speed gear 6 to 9 are provided on both the shafts 3 and 5. A synchronizer 10 is provided for selectively engaging a rotatably mounted gear 6a or 7a of the first or second speed gear with the output shaft 5, and a synchronizer 11 is provided for selectively engaging a rotatably mounted gear 8a or 9a of the third or fourth speed gear with the input shaft 3. A reverse gear 12 secured to input shaft 3 is operatively engaged through an idler with a gear 13 formed on a sleeve of the synchronizer 10 to form a reverse gear train.

In the output shaft 5, a front drive shaft 14 is rotatably mounted. A drive pinion 15 formed on the front end of the drive shaft 14 is engaged with a crown gear 17 of a front differential 16. Output shaft 5 and front drive shaft 14 rearwardly extend into a transfer device 18 provided on the back of the transmission 4. The transfer device 18 has a viscous coupling 30 and a rear drive shaft 19 parallel with the front drive shaft 14. The viscous coupling 30 comprises a hub 31 connected to the output shaft 5, a housing 32 rotatably mounted on the hub 31, a plurality of disks 33 secured to hub 31, and a plurality of disks 34 secured to the housing 32, alternating with the disks 33. The housing 32 is filled with a viscous oil. The transmitting torque of the coupling increases with the difference between the speed of the hub 31 and the speed of the housing 32.

Among the front drive shaft 14, hub 31 and housing 32, a clutch 35 is provided. The hub 31 has a gear 22 which is engaged with a gear 23 formed on a hub 23b rotatably mounted on the rear drive shaft 19. The housing 32 has a gear 24 which is engaged with a gear 25 formed on a hub 25b rotatably mounted on the shaft 19. A clutch 40 is provided between the gears 23 and 25 and the rear drive shaft 19.

Figure 2:
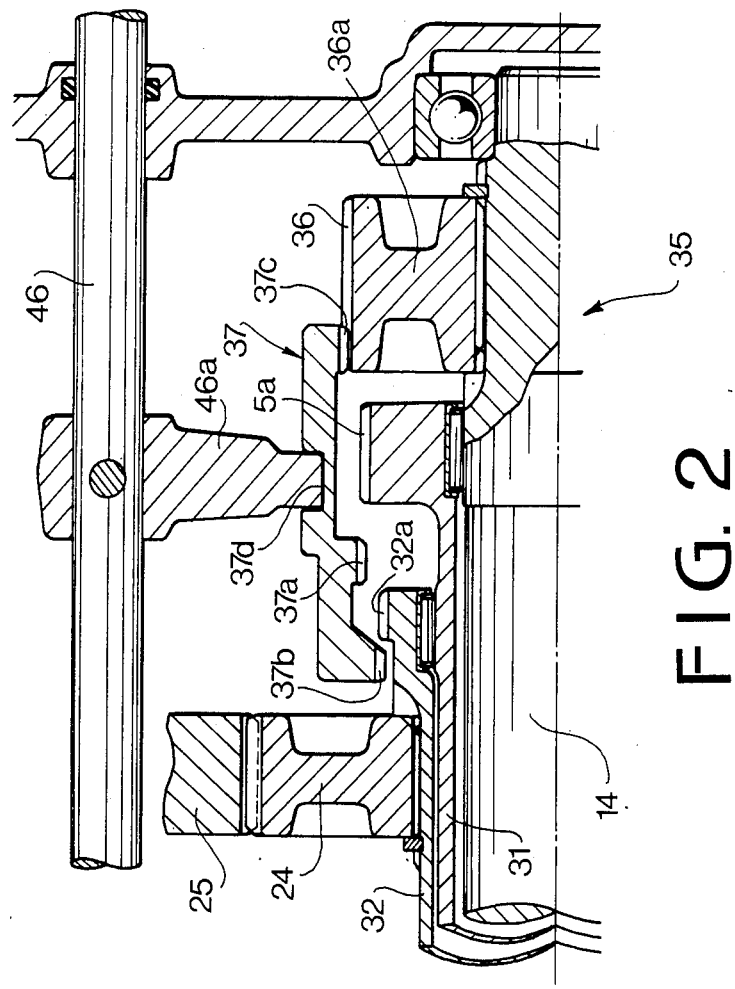
FIG. 2 is an enlarged sectional view showing a part of FIG. 1b.

As shown in FIG. 2, the clutch 35 comprises external splines 5a formed on hub 31, external splines 32a formed on housing 32, external splines 36 formed on a hub 36a secured to the front drive shaft 14, and a sleeve 37. The sleeve 37 has internal splines 37c slidably and always engaged with the external splines 36, internal splines 37a to be engaged with splines 5a, and internal splines 37b to be engaged with splines 32a. The sleeve 37 has an annular groove 37d with which a fork 46a slidably engages. The fork 45a is operatively connected to a selector lever 45 through a shifter rail 46 so as to shift the sleeve 37.

The clutch 40 comprises external splines 41 formed on a hub 41a secured to the rear drive shaft 19, splines 23a formed on the hub 23b, splines 25a formed on the hub 25b, and a sleeve 42. The sleeve 42 has internal splines 42c slidably and always engaged with the splines 41, splines 42a to be engaged with splines 25a, and splines 42b to be engaged with splines 23a. The sleeve 42 has an annular groove 42d in which a fork 46b on the rail 46 engages.

In operation, the output shaft 5 is rotated by the engine through selected speed gears in the transmission 4.

The output is further transmitted to hub 31 of the viscous coupling 30 and gears 22 and 23.

When the selector lever 45 is shifted to a front wheel drive position FWD, sleeve 32 is shifted to the right from the position of FIG. 1, so that splines 37a are engaged with splines 5a. On the other hand, splines 42b are disengaged from splines 23a, and splines 42a do not engage with splines 25a. Thus, the output is transmitted from the output shaft 5 to front wheels through hub 31, splines 5a, 37a, 37c, 36 and front drive shaft 14. Thus, the front-wheel drive system is established.

When the selector lever 45 is shifted to a front-wheel drive with rear-wheel sub-drive position F4W, the engagement state of the clutch 35 does not change, and splines 42a of the clutch 40 are engaged with splines 25a. Thus, the output is transmitted from hub 31 to rear wheels through housing 32, gears 24, 25, hub 25b, splines 25a, 42a, 42c, 41, rear drive shaft 19, propeller shaft 20 and rear differential 21. Thus, a four-wheel drive system with rear-wheel sub-drive is provided.

In the four-wheel drive system, when the front wheels slips and speed difference at the viscous coupling becomes large, the input torque of the coupling is transmitted to rear wheels through the coupling, thereby preventing the slipping. Further, since the vehicle is mainly driven by front wheels, a driving system for an excellent steerability is provided.

When the selector lever 45 is positioned at a front-/rear-wheel drive position FR4W, the engagement of clutch 35 does not change and splines 42b engage with splines 23a. Accordingly, front and rear wheels are connected output shaft 5 without interposing clutches 35 and 40.

When the selector lever 45 is shifted to a rear-wheel drive with front-wheel sub-drive position R4W, the splines 37b of the clutch 35 engage with splines 32a, and splines 42b of the clutch 40 are engaged with splines 23a. Thus, the output of the shaft 5 is transmitted to rear wheels through gears 22, 23, splines 23a, 42b, 42c, 41, rear drive shaft 19, propeller shaft 20 and rear differential 21. On the other hand, the output is transmitted to the front wheels through housing 32, splines 32a, 37b, 37c, 36, and shaft 14. Thus, a rear-wheel drive system with front-wheel sub-drive is provided.

In the four-wheel drive system, when the rear wheels slips and speed difference at the viscous coupling becomes large, the input torque of the coupling is transmitted to front wheels through the coupling thereby preventing the slipping. Further, since the vehicle is mainly by rear wheels, a driving system for an excellent driveability is provided.

When the selector lever 45 is shifted to a rear-wheel drive position RWD as shown in FIG. 1, splines 37a and 37b are disengaged from splines 5a and 32a. On the other hand, splines 42b engage with splines 23a. Thus, the output is transmitted from the output shaft 5 to rear wheels through hub 31, gears 22, 23, splines 23a, 42b, 42c, 41 and rear drive shaft 19. Thus, the rear-wheel drive system is established.

Figure 3A:
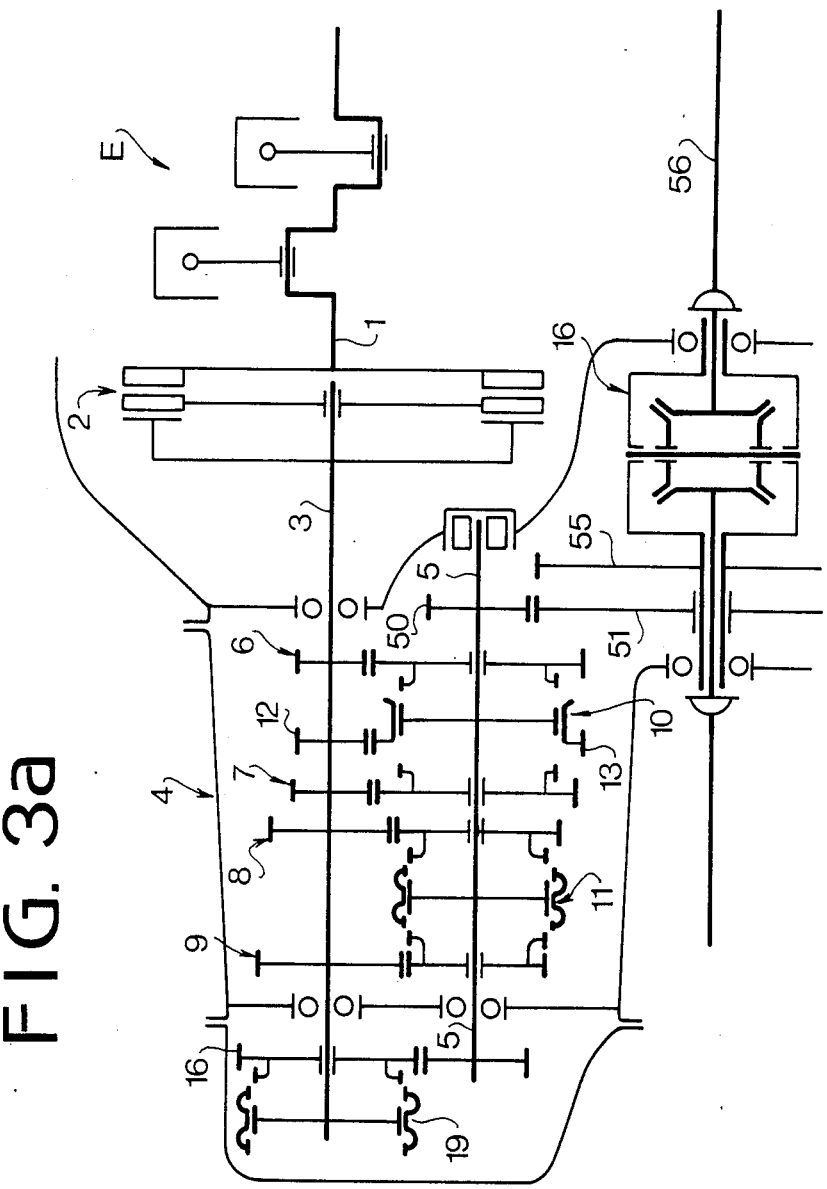
FIGS. 3a and 3b show another embodiment of the present invention.
Figure 3B:
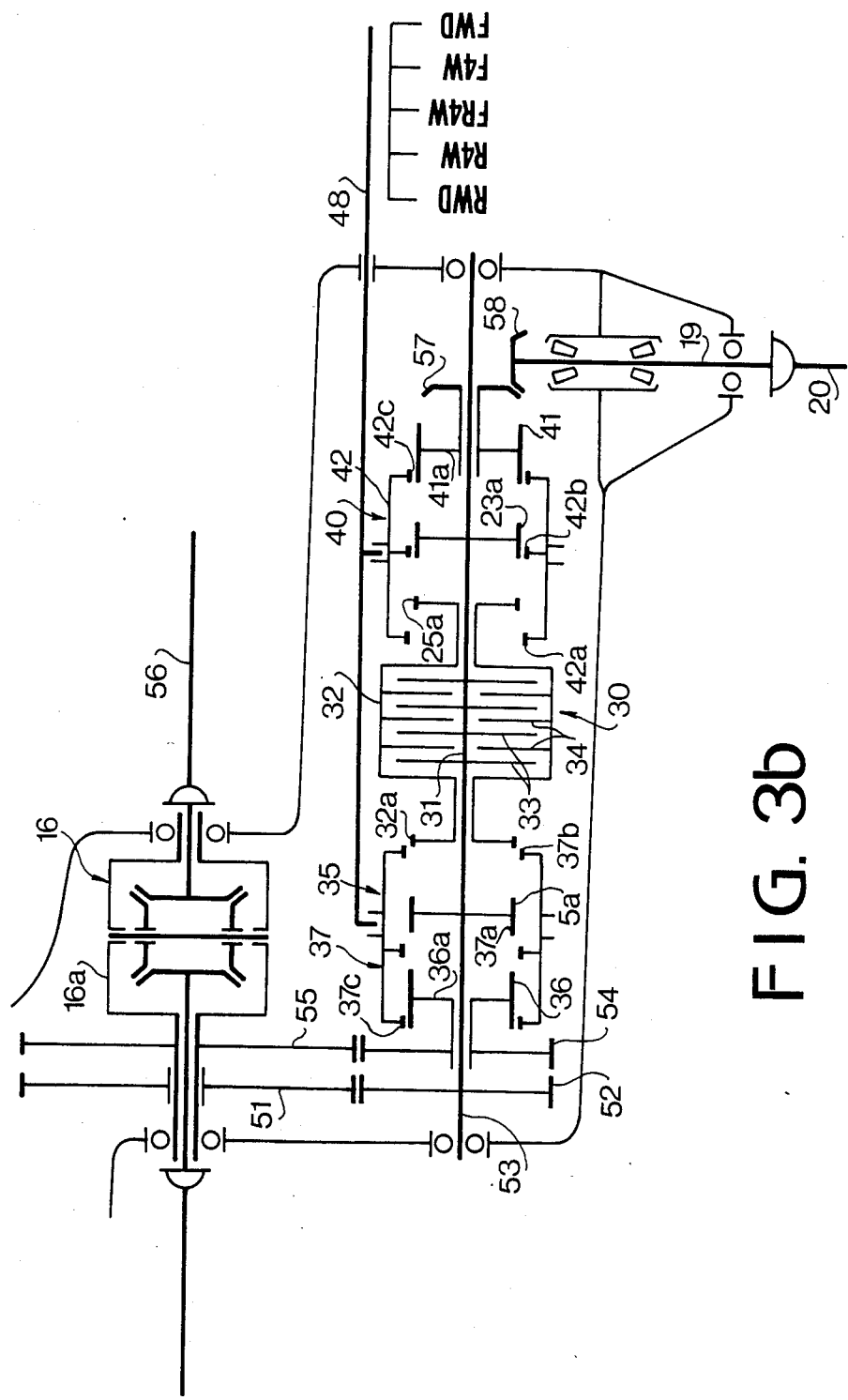

Referring to FIGS. 3a and 3b which show another embodiment of the present invention, engine E, clutch 2 and transmission 4 are transversely mounted on a front portion of a motor vehicle. The same parts of the system as the system of FIG. 1 are identified by the same references as FIG. 1. The transmission 4 has a fifth speed gear 9a and synchronizer 9b for the gear. An output gear 50 secured to the output shaft 5 is engaged with an intermediate gear 51 which engages with a gear 52 secured to a transfer shaft 53. The transfer shaft 53 is connected to hub 31 of the viscous coupling 30. A gear 54 secured to hub 36a of the clutch 35 is engaged with a gear 55 integral with a case 16a of differential 16 which is operatively connected to front axles 56. A bevel gear 57 secured to hub 41a of the clutch 40 is engaged with a bevel gear 58 secured to the rear drive shaft 19.

Operation of this system is the same as the system of FIG. 1.

While the presently referred embodiment of the present invention has been shown and described, it is to be understood that this disclosure is for the purpose of illustration and that various changes and modifications may be made without departing from the spirit and scope of the invention as set forth in the appended claims.

What is claimed is:

1. A four-wheel drive system for a motor vehicle having a transmission comprising:
    a coupling having an input member operatively connected to an output shaft of the transmission and transmitting output of the transmission to an output member through viscous material interposed between the input member and the output member;
    a first clutch for transmitting output of the coupling to front wheels of the vehicle;
    a second clutch for transmitting the output of the coupling to rear wheels of the vehicle;
    each of the clutches having first clutch means and second clutch means, each clutch means including a shiftable engaging member;
    the first clutch means being operatively connected to the output shaft of the transmission and provided for transmitting the output of the transmission to wheels without interposing the coupling, and the second clutch means being operatively connected to the output member of the coupling and provided for transmitting the output of the transmission to wheels through the coupling;
    means for shifting each of the shiftable engaging members, for selectively engaging each of the first and second clutch means.

2. The system according to claim 1 wherein each clutch means comprises shiftable internal splines and external splines.

3. The system according to claim 1 wherein the shifting means comprises a selector lever and a shifter rail connecting the shiftable engaging members to the selector lever.

4. The system according to claim 2 further comprising means for transmitting rotation of the output shaft of the transmission to the shiftable internal splines.

* * * * *